United States Patent [19]

Lakshmanan

[11] Patent Number: 4,500,661

[45] Date of Patent: * Feb. 19, 1985

[54] ADHESIVE COMPOSITION

[75] Inventor: Pallavoor R. Lakshmanan, Houston, Tex.

[73] Assignee: Gulf Oil Corporation, Pittsburgh, Pa.

[*] Notice: The portion of the term of this patent subsequent to Sep. 11, 1996 has been disclaimed.

[21] Appl. No.: 209,375

[22] Filed: Nov. 24, 1980

Related U.S. Application Data

[63] Continuation-in-part of Ser. No. 848,285, Nov. 3, 1977, abandoned.

[51] Int. Cl.$^3$ .............................................. C08L 93/00
[52] U.S. Cl. ...................................... 524/77; 156/334; 524/272; 524/487; 525/222
[58] Field of Search ...................... 156/309.9, 322, 315, 156/334; 427/407 E, 416; 428/484, 520; 260/27 EV, 28.5 AV, 897 B; 525/222

[56] References Cited

U.S. PATENT DOCUMENTS

| | | | |
|---|---|---|---|
| 2,772,247 | 11/1956 | Schroeder | 525/222 |
| 3,390,035 | 6/1968 | Sands | 156/334 |
| 3,689,334 | 9/1972 | Dermody | 156/326 |
| 3,745,054 | 7/1973 | Smedberg | 525/222 |
| 3,896,069 | 7/1975 | Kosaka et al. | 260/28.5 AV |
| 3,926,878 | 12/1975 | Shimizu et al. | 525/222 |
| 4,167,433 | 9/1979 | Lakshmanan | 156/334 |

FOREIGN PATENT DOCUMENTS 47928 4/1976 Japan .................................. 156/334

OTHER PUBLICATIONS

"Waxes", *Encyclopedia of Polymer Science and Technology*, vol. 14, p. 777, ©1971.

*Primary Examiner*—John J. Gallagher
*Attorney, Agent, or Firm*—Deane E. Keith; Forrest D. Stine

[57] ABSTRACT

A novel adhesive composition effective in bonding low-energy plastic surfaces to each other which provides a tensile lap shear strength in excess of about 520 pounds per square inch gauge which comprises (1) an ethylene-vinyl ester copolymer having from about four to about 30 weight percent of a vinyl ester and a melt index of about 0.5 to about 75; (2) a tackifier selected from the group consisting of (a) a rosin, (b) a rosin ester, (c) a terpene resin, (d) a terpene-phenolic resin and (e) a rosin-modified phenolic resin; and (3) a polyethylene wax having a molecular weight of about 750 to about 3000, a penetration of about 0.25 to about 1.5, a density of about 0.93 to about 0.97, a melting point of at least about 110° C. and a linearity of at least about 70 percent, said novel adhesive composition having a Ring and Ball softening point of at least about 110° C.

20 Claims, No Drawings

ADHESIVE COMPOSITION

This application is a continuation-in-part application of my U.S. patent application Ser. No. 848,258, entitled Adhesive Composition And Process for Bonding, filed Nov. 3, 1977, now abandoned.

BACKGROUND OF THE INVENTION

1. Field of the Invention

The present invention is useful in bonding low-energy plastic surfaces (substrates) to each other, for example, in construction, automotive applications, plastic fabricating, packaging, structural foam bonding, assembly of toys, etc. The novel adhesive composition described and claimed herein is effective in bonding low-energy plastic surfaces to each other which provides a tensile lap shear strength in excess of about 520 pounds per square inch gauge which comprises (1) an ethylene-vinyl ester copolymer having from about four to about 30 weight percent of a vinyl ester and a melt index of about 0.5 to about 75; (2) a tackifier selected from the group consisting of (a) a rosin, (b) a rosin ester, (c) a terpene resin, (d) a terpenephenolic resin and (e) a rosin-modified phenolic resin; and (3) a polyethylene wax having a molecular weight of about 750 to about 3000, a penetration of about 0.25 to about 1.5, a density of about 0.93 to about 0.97, a melting point of at least about 110° C. and a linearity of at least about 70 percent, said novel adhesive composition having a Ring and Ball softening point of at least about 110° C.

2. Description of the Prior Art

Ordinarily, adhesive bonding of low-energy plastic surfaces to each other requires some form of surface treatment prior to application of an adhesive to obtain high bond strengths between the surfaces so contacted. Low-energy plastic surfaces bonded to each other without prior surface treatment, such as by relatively weak, tacky adhesives, are inadequate for many purposes such as those requiring strengths in a range in excess of several hundreds or thousands of pounds per square inch gauge of bonded area.

For strong bonds involving low-energy plastic surfaces, some form of surface treatment or etching is required prior to application of an adhesive. Surface pretreatment of low-energy plastic surfaces, for example, involves either acid etching with sulfuric, nitric, chromic acids or mixtures thereof, or flame treatment, corona discharge treatment, treatment with plasma jets or low and high energy radiation.

Adhesive compositions which may be used for bonding low-energy plastic surfaces, but requiring surface treatment, include polysulfide-rubber modified epoxies, epoxy-polyamides, nitrile-phenolics and polyesters. These compositions, additionally, may require long hours of post-cure and/or clamping at temperatures substantially higher than room temperature. Often at least two of the components of these adhesive compositions must be premixed prior to application.

Consequently, a need exists for adhesive composition and much simpler process for bonding low-energy plastic surfaces to each other. In accordance with the present invention a novel hot melt adhesive composition is provided which requires minimal heating of the surfaces to be bonded together and maximum bond strength in a matter of minutes or a few hours without resort to elaborate postcuring procedures. Further, the adhesive composition of the present invention can be applied in its melt form to low-energy plastic surfaces in such a manner to provide rapid assembly of components and immediate handling of the assembled parts. Another advantage of the present invention is that the bonds can deliver strengths in excess of 520 pounds per square inch gauge under tension, preferably in excess of 550 pounds per square inch gauge.

Unlike the present invention, U.S. Pat. No. 3,560,420 to Tamura et al is directed to an adhesive containing ethylene-vinyl acetate, rosin, and polyethylene having a molecular weight in excess of about 5000 for bonding a resin film to wood.

U.S. Pat. No. 3,615,106 to Flanagan et al discloses an adhesive containing ethylene-vinyl acetate, a tackifier, polyethylene having a molecular weight in excess of 10,000 and a diluent for binding books.

U.S. Pat. No. 3,689,334 to Dermody discloses an adhesive mixture comprising an olefinic interpolymer, such as a copolymer of ethylene and vinyl acetate, a carboxylic functional resin, such as rosin, and a hydrocarbon wax. Although paraffin waxes are preferred, low molecular weight polyethylene can be used.

Japanese Patent Publication 51-47928 to Kobayashi et al, published Apr. 24, 1976, discloses a composition containing an ethylene-vinyl acetate copolymer, a terpene resin and a homopolymer or copolymer of olefins or diolefins having from two to four carbon atoms having an average molecular weight of 500 to 1000.

SUMMARY OF THE INVENTION

I have discovered a unique adhesive composition effective in bonding low-energy plastic surfaces to each other which provides a tensile lap shear strength in excess of about 520 pounds per square inch gauge which comprises (1) an ethylene-vinyl ester copolymer having from about four to about 30 weight percent of a vinyl ester and a melt index of about 0.5 to about 75; (2) a tackifier selected from the group consisting of (a) a rosin, (b) a rosin ester, (c) a terpene resin, (d) a terpenephenolic resin and (e) a rosin-modified phenolic resin; and (3) a polyethylene wax having a molecular weight of about 750 to about 3000, a penetration of about 0.25 to about 1.5, a density of about 0.93 to about 0.97, a melting point of at least about 110° C. and a linearity of at least about 70 percent, said novel adhesive composition having a Ring and Ball softening point of at least about 110° C. A procedure for bonding hot melt adhesives is disclosed and claimed in my copending application Ser. No. 848,283, entitled process for Bonding Low-Energy Plastic Surfaces, filed Nov. 3, 1977.

DESCRIPTION OF THE INVENTION

The adhesive composition of the present invention contains a specific ethylene-vinyl ester copolymer, a tackifier, and a specific polyethylene wax.

(1) Ethylene-Vinyl Ester Copolymer.

Ethylene-vinyl ester copolymers that can be used herein include vinyl esters having from two to four carbon atoms. Examples of suitable ethylene-vinyl ester copolymers are ethylene-vinyl acetate, ethylene-vinyl formate, ethylene-vinyl propionate, ethylene-vinyl butyrate and mixtures thereof. The copolymer must contain from about four to about 30 weight percent, preferably about six to about 25 weight percent, of a vinyl ester, and must have a melt index (fusion coefficient), as measured by ASTM 1238-52T, of about 0.5 to about 75, preferably about 2.0 to about 25. The lower the melt index of the ethylene-vinyl ester copolymer used herein the higher the melting point of the copolymer, the bulk properties thereof are thereby enhanced and the cohesive strength of the polymer is also improved. An adhesive prepared with an ethylene-vinyl ester copolymer having a melt index within the indicated ranges will contribute to its bulk properties, thereby enhancing the performance of an assembly prepared using such adhesive. These copolymers can be prepared by any method generally employed in the art, for example, preparation such as that taught in U.S. Pat. Nos. 2,200,429 to Perrin et al and 2,703,794 to Roedel. In the present invention blends, or mixtures, of ethylene-vinyl ester copolymers are sometimes used to obtain a melt index within the desired range. For example, if blends or mixtures of ethylene-vinyl ester copolymers are employed, individual ethylene-vinyl ester copolymers can be used even if they do not have the melt index defined above, provided the resulting mixture has a melt index within the defined range.

(2) Tackifiers.

As contemplated in the present invention suitable tackifiers can be selected from the group consisting of (a) a rosin, (b) a rosin ester, (c) a terpene resin, (d) a terpene-phenolic resin and (e) a rosin-modified phenolic resin. Tackifiers which are present in the adhesive composition serve to extend the adhesive properties of the ethylene-vinyl ester copolymer. Tackifiers for use in the present invention have a softening point in the range of about 40° to about 150° C., preferably about 65° to about 135° C. Small amounts of tackifiers having a softening point of less than 40° C., or higher than 150° C. can be mixed or blended with tackifiers in the desired range to give desirable results; however, tackifier blends having a tackifier with a softening point of less than 40° C. or higher than 150° C. are not preferred in the invention as set forth. Examples of rosins and rosin esters in the hot melt system include both natural and modified rosins, such as, for example, gum rosin, wood rosin, tall oil rosin, distilled rosin, hydrogenated rosin, dimerized rosin, disproportionated rosin and polymerized rosin; glycerine and pentaerythritol esters of rosin, including stabilized, hydrogenated, polymerized, disproportionated, dimerized and unmodified rosin. Terpene resins, sometimes called polyterpene resins, result from polymerization of terpene hydrocarbons, such as bicyclic monoterpene known as pinene, in the presence of a Friedel-Crafts catalyst at moderately low temperatures. Terpene resins effective for the adhesive composition have a Ring and Ball softening point as measured by ASTM E28-58T of from about 40° to about 135° C. Another example of a suitable terpene resin is a polymerized beta-pinene. Terpene phenolicresins can include, for example, the product resulting from the condensation of bicyclic terpene, in an acidic medium and/or terpene alcohol with phenol. Rosin-modified phenolic resins can include, for example, the reaction products of rosin with phenol-formaldehyde condensate. Rosin and rosin esters can be prepared, for example, according to the methods described in *Encyclopedia of Polymer Science and Technology,* Interscience Publishers, a Division of John Wiley & Sons (New York: 1964), Volume 12, pp. 139–164; terpene resins can be prepared, for example, according to the methods described in Volume 13, pp. 575–596 of the same publication. Terpene-phenolic resins and rosin-modified phenolic resins can be prepared, for example, according to the methods described in *Organic Coating Technology,* H. F. Payne, John Wiley & Sons (New York: 1954), Volume 1, pp. 183–184 and 168–170, respectively.

Polyethylene Wax.

A polyethylene wax is employed to reduce the melt viscosity of the hot melt adhesive composition without appreciably decreasing the adhesive bonding. Suitable polyethylene waxes in the present invention must have an average molecular weight of about 750 to about 3000, preferably about 800 to about 2000. Polyethylene waxes useful in the present invention must be essentially linear, that is, at least 70 percent of the molecules are linear or paraffinic; preferably at least 90 percent are linear upto about 95 percent. The n-paraffin or n-alkane content of hydrocarbon waxes can be determined by molecular sieve adsorption or by urea adduction. The penetration or hardness of the polyethylene wax at 25° C. must be about 0.25 to about 1.5, preferably about 0.75 to about 1.00, as determined by ASTM-D 1321. The density at 25° C. of the polyethylene wax employed in the present invenion must be about 0.93 to about 0.97, preferably about 0.94 to about 0.96. In addition, the polyethylene wax must have a melting point (ASTM D-127) of at least about 110° C., preferably about 110° to about 130° C. Each of the enumerated parameters are interrelated as is readily apparent to one of ordinary skill in the art. The adhesive obtained following the above dictates will have a Ring and Ball softening point (ASTM E 28-58T) of at least about 110° C., generally about 115° to about 130° C. It is highly desirable to have as high a Ring and Ball softening point as possible in an adhesive in order to obtain the desired performance at an elevated temperature. Polyethylene waxes can be obtained, for example, by the low-pressure polymerization of ethylene using Ziegler catalysts, such as an aluminum trialkyl, for example, triethyl aluminum, and a titanium halide, for example, titanium tetrachloride.

If desired, other components generally added to an adhesive composition for a particular purpose can also be present in an amount of about 0.1 to about five, preferably about 0.2 to about two, weight percent based on the weight of the final composition. An example of such an additive is an antioxidant such as butylated hydroxy toluene.

For purposes of the present invention a low-energy plastic surface is defined as one which has a critical surface tension ($\gamma$ c) of between about 24 to about 37 dynes/cm (mN/m). For example, polyethylene ranges from about 25.5 to about 36 dynes/cm, and polypropylene ranges from about 24 to about 34 dynes/cm.

In general, the adhesive compositiion defined and claimed herein can have the following components in the following amounts as set forth in Table 1.

TABLE 1

| | Adhesive Composition | |
|---|---|---|
| | Broad Range, Weight Percent | Preferred Range, Weight Percent |
| Ethylene-Vinyl Ester Copolymer | 15 to 55 | 25 to 55 |
| Tackifier | 25 to 45 | 25 to 40 |
| Polyethylene Wax | 5 to 55 | 5 to 50 |

The adhesive composition can be prepared in any conventional manner. Thus, for example, a preferred procedure involves the use of a so-called melt mixing technique in which the wax (diluent) together with an antioxidant, if used, is maintained in a stirred molten state at a temperature between about 130° to about 230°

C., preferably between about 140° to about 170° C., during which time the tackifier is added followed by the addition of the ethylene-vinyl ester copolymer. Mixing is continued until a homogeneous mixture is obtained, approximately after about 15 minutes to about four hours.

The adhesive composition of the present invention is used to bond low-energy surfaces having a critical surface tension of about 24 to about 37 dynes per centimeter to each other. The process involves heating said surfaces which are to be bonded to each other to a temperature of at least about 50° C., preferably about 60° to about 130° C., followed by an application of the adhesive composition of the present invention, while the adhesive is in a temperature range of about 140° to about 240° C., preferably about 160° to about 220° C., to at least one of the surfaces. Then the surfaces are brought in contact with each other. After assembly the bond reaches maximum tensile strength in a matter of minutes or few hours. No post-curing is required, and therefore, rapid assembly and handling of assembled parts is possible.

DESCRIPTION OF PREFERRED EMBODIMENTS

The invention will be further described with reference to the experimental data.

The adhesive composition in the present invention was prepared as follows. A polyethylene wax, in an amount sufficient to make a 201-gram batch of adhesive, was mixed with an antioxidant, butylated hydroxy toluene. The wax-antioxidant mixture was placed in a jacketed 400-ml capacity Brabender Plasticorder and kept hot by an oil both heated to approximately 145° to about 155° C. At a slow, 50-rpm blade setting, the wax-antioxidant mixture was melted and then the tackifier was added while mixing continued. Continued mixing produced a fluid wax-antioxidant-tackifier mixture. An ethylene-vinyl ester copolymer was added to the fluid wax-antioxidant-tackifier mixture in the order of high melt index copolymer followed by low melt index copolymer. Mixing was continued at a top speed setting of the blades at approximately 150 rpm for approximately 10 to about 15 minutes until homogeneity occurred, and then the speed was decreased to 100 rpm and the composition was mixed for approximately five minutes. On completion of mixing, the torque generally leveled-off, and the adhesive composition was ready to be poured. Total mixing time was about 15 to about 20 minutes.

Low energy plastic test specimens were prepared in accordance with the following procedure. Test strips having a dimension of $1 \times 3 \times \frac{1}{8}$ in. (2.54×7.5×0.31 cm) or 1×3×3/16 in. (2.54×7.5×0.47 cm) were used in the preparation of tensile lap shear strength test specimens. The strips were cleaned with acetone rinse and wiped dry. The test strips (two for each test specimen) were then exposed to an infrared lamp to heat the surface areas to be bonded to between about 90° to about 95° C. Molten adhesive at temperatures between about 176° to about 190° C. was applied as a $\frac{1}{8}$ in. (0.31 cm) bead over a square inch (6.45 cm$^2$) area on one of the test strips. A lap shear strength specimen was prepared immediately following application of the adhesive composition by quickly placing another strip over the adhesive with the heated side of the strip on the adhesive to provide a square inch (6.45 cm$^2$) lap. Manual pressure was used to spread the adhesive over the bonded area. A 500-gram weight was then placed on the bonded area and left for about five minutes, to maintain contact of the surfaces during initial cooling, after which it was removed. The specimen was cooled to 23° C. and excessive adhesive was removed. The specimen was stored overnight prior to testing. At least two specimens were prepared for each evaluation and the values reported as an average of the two for a given test run.

The method used for testing the adhesive bond strength was the tensile lap shear method with modifications as described in U.S. Pat. No. 3,393,174 at columns 2 through 3. The values for lap shear were measured by determining on an Instron the force required to break the bond. As a modification employed herein, the rate of extension was two inches (5 cm) per minute. The force divided by the area of the bond gives the lap shear in pounds per square inch.

Table 2 contains a listing of various types of waxes and their characteristics employed in the preparation of the test runs.

TABLE 2

Properties of Waxes

| Wax No. Used | Description | Penetration[1] | Density[2] | Molecular Weight | Melting Point[3], °C. |
|---|---|---|---|---|---|
| I | Microcrystalline Wax | 16 | 0.942 | <900 | 82.2 |
| II | Microcrystalline Wax | 7 | 0.934 | <900 | 87.7 |
| III | Microcrystalline Wax | 7 | 0.95 | <900 | 86.0 |
| IV | Microcrystalline Wax | 17 | 0.94 | <900 | 82.2 |
| V | Polyethylene Wax | 1 | 0.94 | 900 | 110.0 |
| VI | Polyethylene Wax | 2–4 | 0.92 | 1700 | 117.0 |
| VII | Refined Microcrystalline Wax | 15–20 | 0.94 | <900 | 85.0 |
| VIII | Polyethylene Wax | 3 | 0.908 | 7000 | 106.0 |
| IX | Polyethylene Wax | 3–4 | 0.96 | <2000 | 91.6 |
| X | Polyethylene Wax | 1 | 0.96 | 1600 | 118.0 |

[1]Hardness as determined by ASTM D-1321 at 25° C.
[2]g/cc, at 25° C.
[3]ASTM D-127

A series of runs was carried out using the specific adhesive composition as set forth in Table 3.

TABLE 3

Adhesive Composition[1]

| Component | Part by Weight |
|---|---|
| Ethylene-Vinyl Acetate Copolymer A[2] | 10 |
| Ethylene-Vinyl Acetate Copolymer B[3] | 30 |
| Glycerine Ester of Wood Rosin[4] | 40 |

TABLE 3-continued

| Adhesive Composition[1] | |
|---|---|
| Component | Part by Weight |
| Wax[5] | 20 |

[1]Optional antioxidant, for example, 0.5 parts by weight butylated hydroxy toluene was used in all experiments herein.

[2]18 weight percent vinyl acetate; melt index 500 ⎫ combined melt
[3]18 weight percent vinyl acetate; melt index 2.5 ⎭ index = 8.8

[4]Softening point 83° C., Staybelite Ester 10 from Hercules Inc.
[5]Variable as identified in Table 2.

The results of these runs are given in Table 4 as Runs Nos. 1 to 10.

TABLE 4
Influence of Wax on Adhesive Performance as Measured by Tensile Lap Shear Properties

| Run No. | Wax No. Used | Viscosity,[1] cps at 350° F. (176.6° C.) | Tensile Lap Shear,[2] psi (kg/cm$^2$) | Ring and Ball Softening Point,[4] °C. |
|---|---|---|---|---|
| 1 | I | 13,600 | 468 (32.9) | 90.0 |
| 2 | II | 13,500 | 457 (32.1) | 92.0 |
| 3 | III | 13,625 | 487 (34.23) | 88.0 |
| 4 | IV | 15,000 | 427 (30.02) | 88.0 |
| 5 | V | 15,925 | 705 (49.56)[3] | 115.0 |
| 6 | VI | 20,200 | 465 (32.69) | 107.0 |
| 7 | VII | 14,610 | 512 (36.02) | 90.5 |
| 8 | VIII | >25,000 | 404 (28.40) | 98.5 |
| 9 | IX | 13,200 | 505 (35.5) | 93.5 |
| 10 | X | 20,125 | 810 (56.94)[3] | 118.5 |

[1]Brookfield Thermosel.
[2]One square inch overlap (6.45 cm$^2$),
[3]One-half inch overlap (1.61 cm$^2$). Note: the plastic failed before the bond broke so instead of one square inch overlap one-half square inch overlap was used and tensile lap shear strength for breaking bond measured.
[4]ASTM E28-58T.

The data in Table 4 clearly show that only in Runs Nos. 5 and 10, wherein the wax used had, in every case, penetration, density, molecular weight and melting point values within the defined critical ranges, and the resulting adhesive had a Ring and Ball softening point within the defined critical ranges, were the tensile lap shear values in excess of 520 pounds per square inch gauge.

A further study was made to determine the influence of the amount of polyethylene wax used in the adhesive composition on tensile lap shear strength. An additional run, Run No. 11, was prepared in accordance with the composition reported in Table 5 and was compared to the composition of Run No. 5 repeated in Table 5 for convenience. Both Run Nos. 5 and 11 fall within the parameters of the present invention. Run 5 had a wax level of 20 percent while Run 11 had a wax level of 40 percent. Again excellent results were obtained.

TABLE 5
Influence of Amount of Wax on Adhesive Performance

| Run Numbers | 5 | 11 |
|---|---|---|
| Composition, parts by weight[1] | | |
| Ethylene-Vinyl Acetate Copolymer A, 18% vinyl acetate, melt index 500. | 10 | 7.5 |
| Ethylene-Vinyl Acetate Copolymer B, 18% vinyl acetate, melt index 2.5. | 30 | 22.5 |
| Glycerine Ester of Hydrogenated Rosin, softening point 83° C. | 40 | 30 |
| Wax No. V in Table 2. | 20 | 40 |
| Inspections | | |
| Ring and Ball Softening Point, °C. | 115.0 | 118.0 |
| Viscosity, cps at 350° F. (176.6° C.) | 15,925 | 3,120 |
| Tensile Lap Shear, psi (kg/cm$^2$) | | |
| one-square inch overlap (6.45 cm$^2$) | >550 (38.66)[2] | >553 (38.87)[2] |
| one-half square inch overlap (1.61 cm$^2$) | 705 (49.56) | 765 (53.87) |

[1]See Table 3, footnote #1.
[2]Plastic failed before bond. See Table 4, footnote #3.

A study was made to determine the effect of different tackifiers in the adhesive composition on tensile lap shear strength. The results are reported as Run Nos. 12, 13, 14, and 15 in Table 6. In the present invention Run Nos. 12 through 15 fall within the parameters of the present invention. Once again excellent results were obtained.

TABLE 6
Effect of Different Tackifiers on Adhesive Performance

| Run Numbers | 12 | 13 | 14 | 15 |
|---|---|---|---|---|
| Composition, parts by weight[1] | | | | |
| Ethylene-Vinyl Acetate Copolymer A, 18% vinyl acetate, melt index 500 | 10 | 10 | — | 10 |
| Ethylene-Vinyl Acetate Copolymer B, 18% vinyl acetate, melt index 2.5 | 30 | 30 | 40 | 30 |
| Glycerine Ester of Tall Oil Rosin[2] | 40 | — | — | — |
| Terpene Resin[3] | — | 40 | — | — |
| Terpene-Phenolic Resin[4] | — | — | 40 | — |
| Glycerine Ester of Highly Hydrogenated Rosin[5] | — | — | — | 40 |
| Wax No. V in Table 2. | 20 | 20 | 20[7] | 20[7] |
| Inspections | | | | |
| Ring and Ball Softening Point, °C. | 115.0 | 113.0 | 125.0 | 119.0 |
| Viscosity, cps at 350° F. (176.6° C.) | 16,025 | 19,000 | 49,500 | 20,000 |
| Tensile Lap Shear, psi (kg/cm$^2$) | | | | |
| one-square inch overlap (6.45 cm$^2$)[6] | >530 (>37.2) | >543 (>37.2) | >555 (>39.02) | |

TABLE 6-continued

| Effect of Different Tackifiers on Adhesive Performance | | | | |
|---|---|---|---|---|
| Run Numbers | 12 | 13 | 14 | 15 |
| one-half square inch overlap (1.61 cm$^2$) | 1005 (70.6) | 665 (46.75) | — | 1080 (75.9) |

[1] See Table 3, footnote #1.
[2] Zonester 85 (R & B Softening Point 83° C.) from Arizona Chemical Company.
[3] Nirez 1135 (R & B Softening Point 135° C.) from Reichhold Chemicals.
[4] Nirez 2019 (R & B Softening Point 122° C.) from Reichhold Chemicals.
[5] Foral 85 (R & B Softening Point 82° C.) from Hercules Inc.
[6] Plastic failed before bond. See Table 4, footnote #3.
[7] Wax No. X in Table 2.

The effect of the amount of tackifier in the adhesive composition on the tensile lap shear strength was evaluated in Table 7 as Run Nos. 16 and 17. Both Run Nos. 16 and 17 are excellent compositions and result in the desired tensile lap shear strength.

TABLE 7

| Effect of Amount of Tackifier on Adhesive Performance | | |
|---|---|---|
| Run Numbers | 16 | 17 |
| Composition, parts by weight[1] | | |
| Ethylene Vinyl Acetate Copolymer A, 18% vinyl acetate, melt index 500. | 10 | 13.3 |
| Ethylene Vinyl Acetate Copolymer B, 18% vinyl acetate, melt index 2.5. | 30 | 40 |
| Glycerine Ester of Tall Oil Rosin[2] | 40 | 26.7 |
| Wax No. X in Table 2 | 20 | 20 |
| Inspections | | |
| Ring and Ball Softening Point, °C. | 120.0 | 121.0 |
| Viscosity, cps at 350° F. (176.6° C.) | 24,600 | >25,000 |
| Tensile Lap Shear, psi (kg/cm$^2$) | 900 (63.27) | 805 (56.59) |
| one-half square inch overlap (1.61 cm$^2$)[3] | | |

[1] See Table 3, footnote #1.
[2] See Table 6, footnote #2.
[3] See Table 4, footnote #3.

Table 8 contains Run Nos. 18 through 23. Run Nos. 18 through 23 demonstrate the effectiveness of different adhesive compositions. Run No. 18 used 10 percent vinyl acetate with a melt index of 70, while No. 19 contained 18 percent vinyl acetate with a melt index of 2.5. Run Nos. 20 and 21 demonstrate the effect of the tackifier softening point on the tensile lap shear strength of the adhesive composition. Run No. 22, having a combined melt index of 7.2, is a 1:3 blend or mixture of 25 percent vinyl acetate, melt index 400 and 25 percent vinyl acetate, melt index 1.05. Run No. 23, having a combined melt index of 8.9, is a 1:3 blend or mixture of 28 percent vinyl acetate, melt index 400 and 28 percent vinyl acetate, melt index 3.0. Run Nos. 22 and 23 demonstrate that mixtures of copolymers containing varying concentrations of vinyl acetate levels and differing melt indices are suitable for use herein.

TABLE 8

| | Adhesive Compositions[1] | | | | | |
|---|---|---|---|---|---|---|
| | 18 | 19 | 20 | 21 | 22 | 23 |
| Composition, parts by weight[1] | | | | | | |
| Ethylene-Vinyl Acetate Copolymer (10% vinyl acetate, melt index 70) | 40 | — | — | — | — | — |
| Ethylene-Vinyl Acetate Copolymer (18% vinyl acetate, melt index 2.5) | — | 40 | 40 | 40 | — | — |
| Ethylene-Vinyl Acetate Copolymer (25% vinyl acetate, melt index 400) | — | — | — | — | 10 | — |
| Ethylene-Vinyl Acetate Copolymer (25% vinyl acetate, melt index 1.05) | — | — | — | — | 30 | — |
| Ethylene-Vinyl Acetate Copolymer (28% vinyl acetate, melt index 400) | — | — | — | — | — | 10 |
| Ethylene-Vinyl Acetate Copolymer (28% vinyl acetate, melt index 3.0) | — | — | — | — | — | 30 |
| Glycerine Ester of Tall Oil Rosin (softening point 83° C.) | 40 | — | — | — | 40 | 40 |
| Glycerine Ester of Highly Hydrogenated Rosin (softening point 82° C.) | — | 40 | — | — | — | — |
| Terpene-Phenolic Resin (softening point 100° C.) | — | — | 40 | — | — | — |
| Terpene-Phenolic Resin (softening point 122° C.) | — | — | — | 40 | — | — |
| Wax No. X in Table 2. | 20 | 20 | 20 | 20 | 20 | 20 |
| Inspections | | | | | | |
| Ring and Ball Softening Point, °C. | 118.0 | 121.0 | 120.0 | 125.0 | 124.0 | 123 |
| Viscosity, cps at 350° F. (176.6° C.) | 5,375 | 27,000 | 28,200 | 42,000 | 19,50 | 18,500 |
| Tensile Lap Shear, psi (kg/cm$^2$) | 896[2] | 663 | 623 | 645 | 550 | 570 |
| one square inch overlap (6.45 cm$^2$) | (63.0) | (46.6) | (43.8) | (45.3) | (38.6) | (40.0) |

[1] See Table 3, footnote #1.
[2] One-half square inch overlap.

Obviously, many modifications and variations of the invention, as hereinabove set forth, can be made without departing from the spirit and scope thereof, and therefore only such limitations should be imposed as are indicated in the appended claims.

I claim:

1. A novel adhesive composition effective in bonding low-energy plastic surfaces to each other which provides a tensile lap shear strength in excess of about 520 pounds per square inch gauge which comprises (1) one ethylene-vinyl ester copolymer having from about four to about 30 wieght percent of a vinyl ester and a melt index of about 0.5 to about 75; (2) a tackifier selected from the group consisting of (a) a rosin, (b) a rosin ester, (c) a terpene resin, (d) a terpene-phenolic resin and (e) a rosin-modified phenolic resin; and (3) a polyethylene wax having a molecular weight of about 750 to about 3000, a penetration of about 0.25 to about 1.5, a density of about 0.93 to about 0.97, a melting point of at least about 110° C. and a linearity of at least about 70 percent, said novel adhesive composition having a Ring and Ball softening point of at least about 110° C.

2. An adhesive composition according to claim 1 wherein said ethylene-vinyl ester copolymer is selected from the group consisting of ethylene-vinyl acetate, ethylene-vinyl formate, ethylene-vinyl propionate, ethylene-vinyl butyrate, and mixtures thereof.

3. An adhesive composition according to claim 1 wherein said copolymer contains from about six to about 25 weight percent of a vinyl ester.

4. An adhesive composition according to claim 1 wherein said copolymer has a melt index of about 2.0 to about 25.

5. An adhesive composition according to claim 1 wherein said tackifier has a softening point of about 40° to about 150° C.

6. An adhesive composition according to claim 1 wherein said tackifier has a softening point of about 65° to about 135° C.

7. An adhesive composition according to claim 1 wherein said rosin is selected from the group consisting of gum rosin, wood rosin, tall oil rosin, distilled rosin, hydrogenated rosin, dimerized rosin, and polymerized rosin.

8. An adhesive composition according to claim 1 wherein said rosin ester is selected from the group consisting of glycerine and pentaerythritol esters of stabilized, hydrogenated, polymerized, disproportionated, dimerized and unmodified rosin.

9. An adhesive composition according to claim 1 wherein said terpene resin is selected from the group consisting of polyterpene and polymerized beta-pinene resins.

10. An adhesive composition according to claim 1 wherein said terpene-phenolic resin is the condensation product of phenol with terpene alcohol or alpha-terpinene.

11. An adhesive composition according to claim 1 wherein said tackifier is a rosin-modified phenolic resin.

12. An adhesive composition according to claim 1 wherein said polyethylene wax has a molecular weight of about 800 to about 2000.

13. An adhesive composition according to claim 1 wherein said polyethylene wax is composed of at least about 90 percent linear molecules.

14. An adhesive composition according to claim 1 wherein said polyethylene wax is composed of about 90 to about 95 percent linear molecules.

15. An adhesive composition according to claim 1 wherein said polyethylene wax has a penetration of about 0.75 to about 1.00.

16. An adhesive composition according to claim 1 wherein said polyethylene wax has a density of about 0.94 to about 0.96.

17. An adhesive composition according to claim 1 wherein said polyethylene wax has a melting point of about 110° to about 130° C.

18. An adhesive composition according to claim 1 having a Ring and Ball softening point of about 115° to about 130° C.

19. An adhesive composition according to claim 1 wherein said ethylene-vinyl ester copolymer is about 15 to about 55 weight percent; said tackifier is about 25 to about 45 weight percent; and said polyethylene wax is about five to about 55 weight percent of the total composition.

20. An adhesive composition according to claim 1 wherein said ethylene-vinyl ester copolymer is about 25 to about 55 weight percent; said tackifier is about 25 to about 40 weight percent; and said polyethylene wax is about five to about 50 weight percent of the total composition.

* * * * *

UNITED STATES PATENT OFFICE
CERTIFICATE OF CORRECTION

Patent No. 4,500,661     Dated February 19, 1985

Inventor(s) Pallavoor R. Lakshmanan

It is certified that error appears in the above-identified patent and that said Letters Patent are hereby corrected as shown below:

Cols. 9-10 (Table 7), last figures under each of Runs Nos. 16 and 17, "900 (63.27)" and "805 (56.59)", move each figure down one space to read across from "one-half square inch overlap (1.61 $cm^2)^3$."

Cols. 9-10 (Table 8), line 58 (third line from bottom of table), under column headed 22, "19,50" should read --19,500--

Cols. 9-10 (Table 8), lines 59 and 60 (last two lines of table), move all items under Runs Nos. 18-23 down one space, to read across from "one square inch overlap (6.45 $cm^2$)."

Signed and Sealed this

Twentieth Day of August 1985

[SEAL]

Attest:

DONALD J. QUIGG

Attesting Officer     Acting Commissioner of Patents and Trademarks